(12) United States Patent
Nelson et al.

(10) Patent No.: US 8,584,968 B2
(45) Date of Patent: Nov. 19, 2013

(54) SPRINKLER HEIGHT ADJUSTMENT ON AN IRRIGATION MACHINE

(75) Inventors: Reid A. Nelson, Walla Walla, WA (US); Barton R. Nelson, Walla Walla, WA (US); Craig B. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 886 days.

(21) Appl. No.: 12/722,883

(22) Filed: Mar. 12, 2010

(65) Prior Publication Data
US 2011/0220233 A1 Sep. 15, 2011

(51) Int. Cl.
*B05B 1/20* (2006.01)

(52) U.S. Cl.
USPC .......... 239/176; 239/162; 239/164; 239/169; 285/124.3; 285/124.4; 285/208; 248/74.1

(58) Field of Classification Search
USPC .............. 248/74.1, 75, 314, 312, 311.2, 511, 248/534, 539; 239/169, 734, 162, 164, 176; 138/106; 285/61, 124.3, 124.4, 208
See application file for complete search history.

(56) References Cited

U.S. PATENT DOCUMENTS

| | | | |
|---|---|---|---|
| 3,117,725 A * | 1/1964 | Palmer | 239/168 |
| 3,237,809 A * | 3/1966 | Daragan et al. | 222/135 |
| 4,735,365 A | 4/1988 | Smeller et al. | |
| 4,763,836 A | 8/1988 | Lyle et al. | |
| 4,795,100 A | 1/1989 | Purtell et al. | |
| 4,877,189 A | 10/1989 | Williams | |
| 4,949,905 A * | 8/1990 | Jones et al. | 239/279 |
| 5,246,164 A | 9/1993 | McCann et al. | |
| 5,516,044 A * | 5/1996 | Thorstensson | 239/159 |
| 5,927,603 A | 7/1999 | McNabb | |
| 6,230,091 B1 | 5/2001 | McQuinn | |
| 7,311,044 B1 | 12/2007 | Hirst et al. | |

* cited by examiner

*Primary Examiner* — Dinh Q Nguyen
(74) *Attorney, Agent, or Firm* — Nixon & Vanderhye, P.C.

(57) ABSTRACT

A height adjustment assembly for a drop hose on an irrigation machine is composed of an elongated bracket having a first end provided with a pair of fittings, and a second opposite end provided with a drop hose retention ring; the drop hose retention ring formed with an opening adapted to permit a drop hose to slide through the opening, the opening defined by an interior surface provided with a pair of diametrically opposed open slots, and a pair of diametrically opposed locking recesses. A key lock fitting is adapted for connecting aligned hose ends of the drop hose and is provided with a pair of diametrically-opposed keys which, in use, are adapted to slide through the pair of opposed open slots and, upon ninety degree rotation of the diametrically-opposed keys, to be received in the pair of diametrically opposed locking recesses.

5 Claims, 5 Drawing Sheets

SPRINKLER HEIGHT ADJUSTMENT ON AN IRRIGATION MACHINE

BACKGROUND OF THE INVENTION

This invention relates generally to agricultural irrigation machines, and more specifically, to a bracket assembly that can be used to quickly and reliably change the height of sprinklers on drop hoses suspended from an overhead machine pipe or truss span.

In a typical center-pivot or linear irrigation machine, sprinklers are mounted on drop tubes connected to outlets spaced along the top of the pipe or truss span assembly that supplies water to the sprinklers.

There are times when it is desirable to raise or lower the height of the various sprinklers, relative to ground level. For example, it may be desirable to raise the sprinklers to accommodate the changing height of a crop during the crop-growing season. In another example, it may be desirable to lower the height of the sprinklers during windy conditions to minimize wind-blown vaporization loss.

There are various sprinkler height-changing techniques disclosed in the prior art, as represented in the patent literature. For example, in U.S. Pat. No. 4,795,100, the sprinkler height is adjusted by looping the drop hose about the truss span. In U.S. Pat. No. 4,763,836, the sprinkler height is adjusted using pulleys or reels mounted on the truss span. In U.S. Pat. No. 4,735,365, the sprinkler height is adjusted by clamping the drop hose at the desired level.

SUMMARY OF THE INVENTION

The present invention provides a simple, reliable and very accurate sprinkler height-changing device for use on, for example, center-pivot or linear irrigation machines.

In accordance with a first exemplary but nonlimiting embodiment, the present invention provides a height adjustment assembly for a drop hose on an irrigation machine comprising an elongated bracket having a first end provided with a pair of fittings, and a second opposite end provided with a drop hose retention ring; the drop hose retention ring formed with an opening adapted to permit a drop hose to slide through the opening, the opening defined by an interior surface provided with a pair of diametrically opposed open slots, and a pair of diametrically opposed locking recesses; and a key lock fitting adapted for connecting aligned hose ends of the drop hose and provided with a pair of diametrically-opposed keys which, in use, are adapted to slide through the pair of opposed open slots and, upon ninety degree rotation of the diametrically-opposed keys, to be received in the pair of diametrically opposed locking recesses.

In another exemplary but nonlimiting aspect, the invention provides a drop hose assembly for attachment to a water supply conduit on an irrigation machine comprising a flexible drop hose comprised of plural sections; an elongated bracket having a first end provided with a pair of aligned fittings including a male thread fitting adapted to secure the elongated bracket to a water supply pipe on the irrigation machine, and a barbed hose fitting securing one end of the flexible drop hose; a second opposite end of the elongated bracket provided with a drop hose retention ring, the drop hose retention ring formed with an opening through which one of the sections of the drop hose passes, the opening defined by an interior surface provided with a pair of diametrically-opposed open slots, and a pair of diametrically-opposed locking recesses; and at least a pair of key lock fittings spliced into the flexible drop hose at axially spaced locations therealong, each of the key lock fittings provided with a pair of diametrically-opposed keys which are adapted to pass through the pair of diametrically-opposed open slots and upon rotation of the flexible drop hose, to be seated in the pair of diametrically-opposed recesses to thereby enable the flexible drop hose to be held by the elongated bracket in at least two positions along the length of the flexible drop hose, thereby permitting height adjustment of the sprinkler.

In still another exemplary but nonlimiting aspect, the invention provides a bracket for use in retaining a drop hose supported from an overhead irrigation truss, the drop hose adapted to carry a sprinkler at a remote free end thereof, the bracket comprising an elongated body having a pair of fittings at one end and a hose retention ring at an opposite end, one of the pair of fittings adapted to connect the bracket to the overhead truss and the other of the pair of fittings adapted to attach an end of the drop hose; the hose retention ring formed with an opening adapted to receive the drop hose in an orientation substantially perpendicular to the elongated body, the opening defined by an interior annular surface formed to include at least one radially-extending, axially open slot and at least one radially-extending axially-closed recess.

The invention will now be described in detail connection with the drawings identified below.

DETAILED DESCRIPTION OF THE INVENTION

Figure 1:
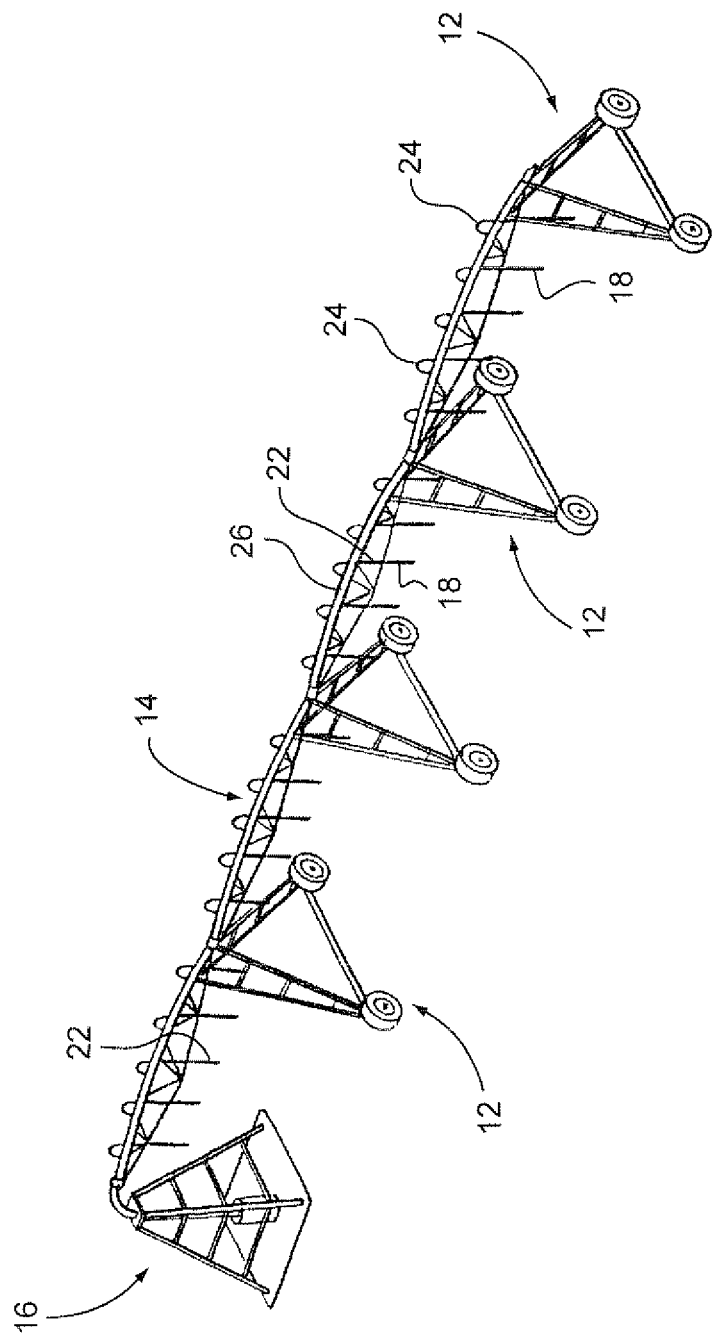
FIG. 1 is a simplified partial perspective of a conventional center-pivot irrigation machine.

FIG. 1 illustrates in simplified form a conventional center-pivot irrigation machine 10. In very general terms, the machine 10 comprises a plurality of wheeled towers 12 supporting an overhead pipe or truss span assembly 14 that pivots about a stationary center tower 16. The span assembly supplies water to the many sprinklers 18 that are suspended from the overhead span assembly by individual, flexible drop tubes 22. Typically, the drop tubes extend from a "gooseneck" pipe section 24 secured to the upper side of the overhead pipe 26. This invention relates to a unique bracket assembly that facilitates adjustment of the height of the sprinklers 18 relative to ground level in a quick and reliable manner.

Figure 2:
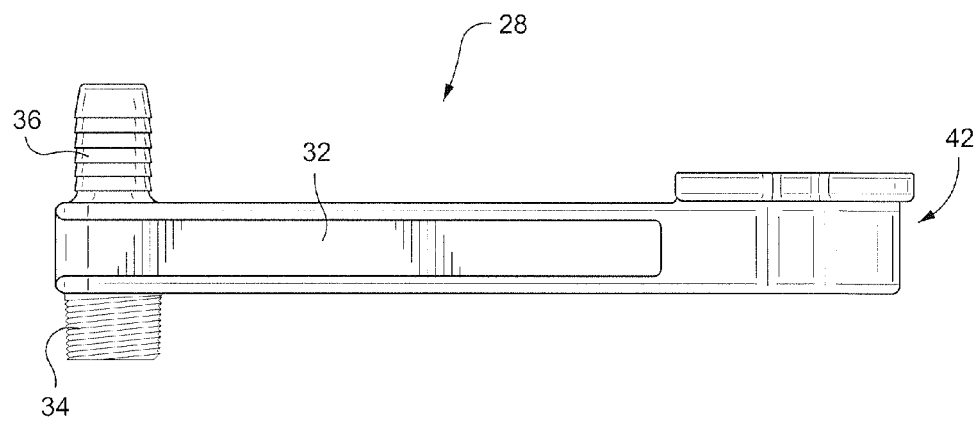
FIG. 2 is a side elevation of an exemplary but nonlimiting bracket in accordance with the invention.
Figure 3:
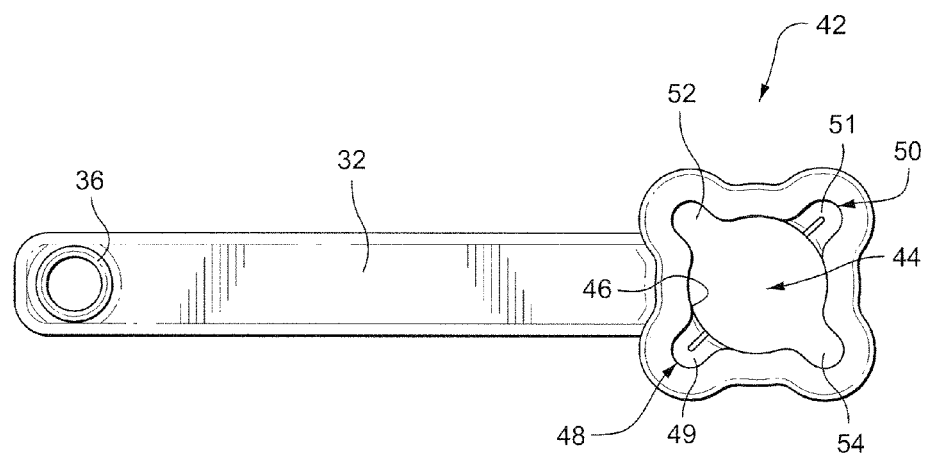
FIG. 3 is a top plan view of the bracket shown in FIG. 2.
Figure 4:
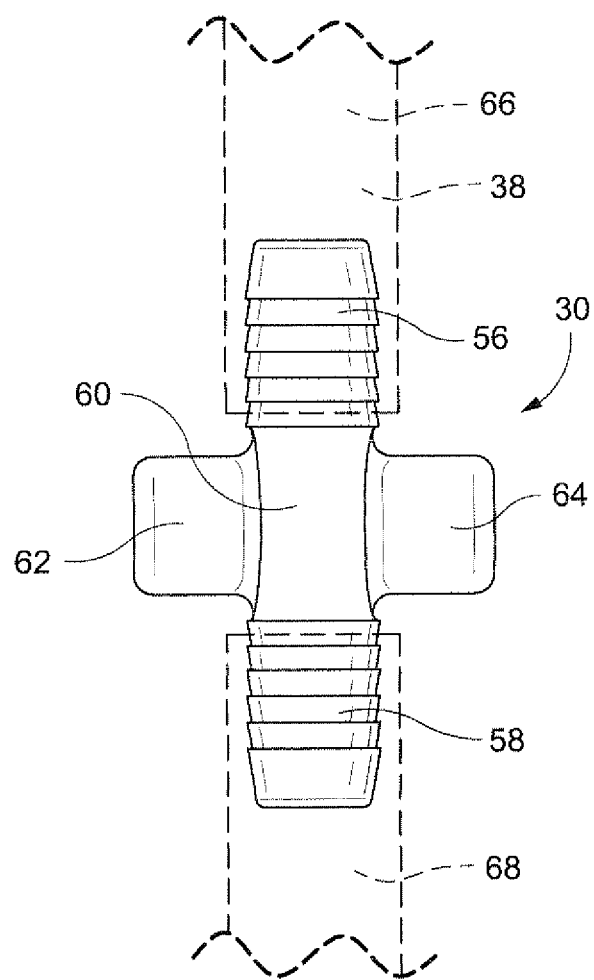
FIG. 4 is a side elevation of a key lock fitting for use with the bracket shown in FIGS. 2 and 3.

FIGS. 2-4 illustrate an exemplary but nonlimiting embodiment of the bracket assembly mentioned above. More specifically, the bracket assembly includes a bracket 28 (FIGS. 2 and 3) and a key-lock fitting 30 (FIG. 4). The bracket 28 is composed of an elongated metal or plastic body 32 provided at one end with a pair of coaxially-aligned pipe and hose fittings 34, 36. The pipe fitting 34 may be a standard ¾ NPT male thread fitting, adapted to be threaded into a female thread on the overhead pipe 26, while the hose fitting 36 may be a standard barbed fitting adapted to receive a flexible hose 38, secured by a conventional hose clamp 40 (see FIGS. 5 and 6).

The opposite end of the elongated body 32 is formed with an integral hose retention ring 42 formed with a through-opening 44 adapted to permit a drop hose to slide therethrough as explained further below. The opening 44 is defined by an annular interior wall surface 46 that is formed to include a pair of diametrically-opposed, locking grooves or recesses 48, 50 which extend radially outwardly of the wall surface 46. Spaced 90 degrees from the recesses 48, 50 are a pair of diametrically-opposed, axially open slots 52, 54, the purpose for which will also be described below. In the exemplary embodiment, the axis extending through the aligned coaxial fittings 34, 36 and the center axis of the through-opening 44 are substantially parallel.

Figure 5:
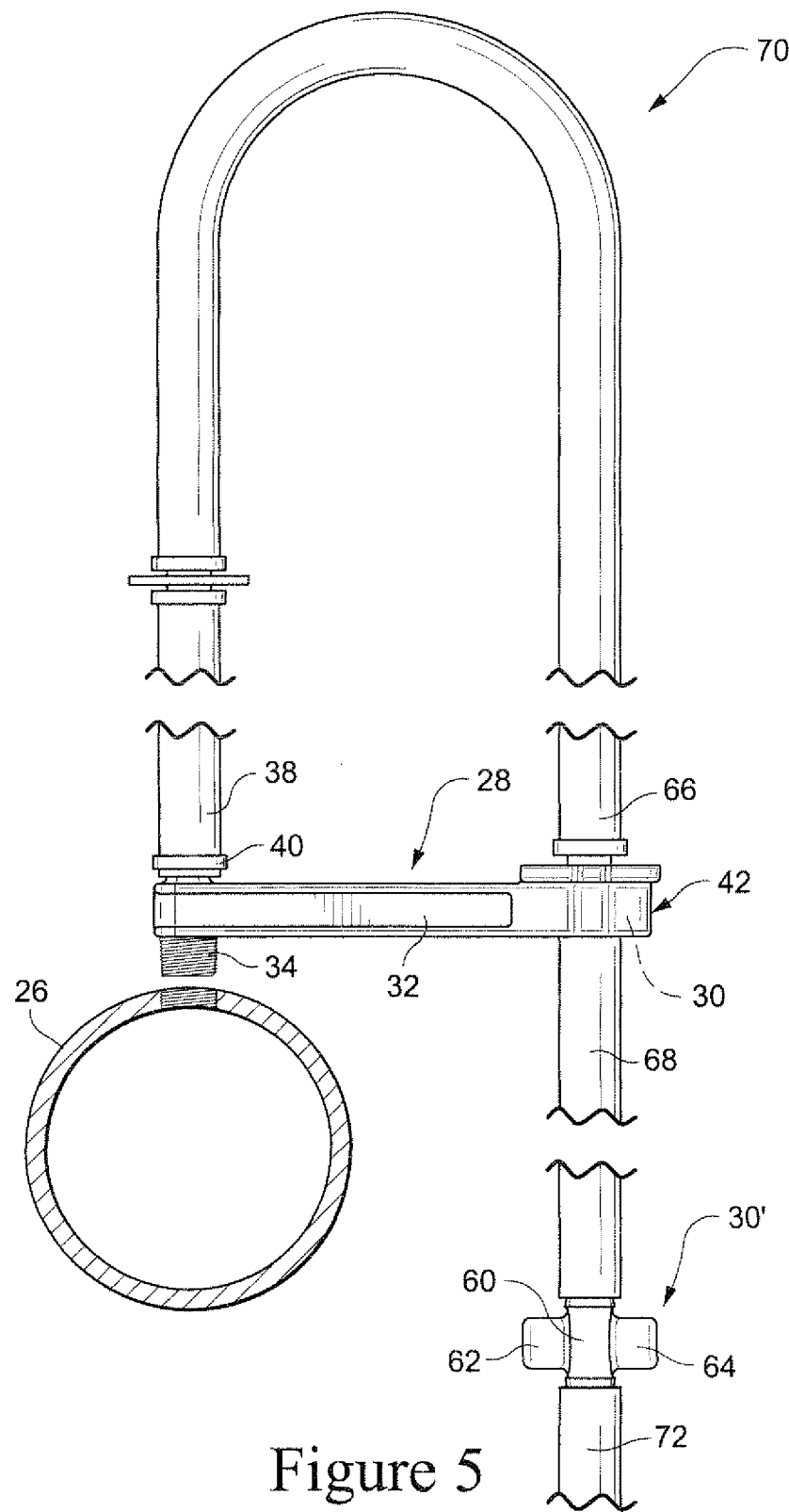
FIG. 5 is a side elevation, partly in section and partly exploded, showing the bracket of FIGS. 2 and 3 in place relative to an overhead span assembly of an irrigation machine of the type shown, for example, in FIG. 1.

In the illustrated embodiment, the locking grooves or recesses 48, 50 are oriented at a 45° angle to the body 32 of the bracket. The bracket could also be formed so that the locking grooves or recesses 48, 50 lie on the longitudinal axis of the bracket body (i.e. as viewed in FIG. 3, the retention ring, in effect, could be rotated 45° in a clockwise direction). In this way, and with the key-lock fitting(s) 30 installed in the drop hose with the keys 62, 64 extending parallel to the bracket body 32 as shown in FIG. 5, a consistent adjustment approach is provided where the installer understands how the keys 62, 64 should be aligned relative to the bracket body 32, and that they will be in that same orientation when the height of the drop hose is adjusted and the keys 62, 64 are seated in the locking grooves 48, 50. This arrangement also insures that, after twisting the drop hose to permit passage of the keys through the open slots 52, 54, the drop hose is returned to torque-neutral state when the keys 62, 64 are seated on the closed ends 49, 51, respectively, of the locking recesses 48, 50 in the retention ring 42.

The key-lock fitting 30 shown in FIG. 4 is essentially a splice fitting, with a pair of coaxially-aligned, barbed hose fittings 56, 58 extending in opposite directions from a center section 60 formed with a pair of diametrically-opposed keys 62, 64 extending radially outwardly from the center section 60, transverse to the longitudinal center axis of the fitting. In use, the keys 62, 64 are adapted to pass through the slots 52, 54 in the retention ring 42 and, upon 90 degree rotation, to seat on the base surfaces of the locking recesses 48, 50 of the bracket 28. In this regard, the cross-sectional shapes of the keys 62, 64, slots 52, 54 and locking recesses 48, 50 are substantially identical. In this regard, it will be appreciated that the shape of the keys 62, 64 may be varied to include, for example, enlarged free ends or other features, with the shape of the locking recesses 48, 50 modified accordingly, to insure a more secure engagement.

As best seen in FIG. 4, the fittings 56, 58 are adapted to receive ends of adjacent flexible hose sections 66, 68 and conventional hose clamps (not shown in FIG. 4) may be used to secure the hose ends to the fittings. As described further below, the fittings 56, 58 may also be varied to accommodate other types of hose sections.

Turning to FIG. 5, it can be seen that when the bracket 28 is secured to the overhead pipe 26 via fitting 34, the flexible hose 38 and one or more connected hose sections 66, may be bent 180 degrees to form a gooseneck section 70 that allows the flexible hose to be passed through the hose retention ring 42, with additional hose sections 68, 72 etc. suspended below the bracket assembly. Passage of the one or more hose sections through the hose retention ring 42 is enabled by aligning the keys 62, 64 of the key fitting 30 with the slots 52, 54 in the hose retention ring 42. Positioning of the key-lock fitting 30 in the hose retention ring 42 is achieved simply by pulling the hose and key-lock fitting upwardly a sufficient distance to allow the keys 62, 64 to be rotated 90 degrees into alignment with the locking recesses 48, 50 and then dropping the keys into the recesses. In this position, the drop hose is held at the required height and the fitting 30 is prevented from rotating into a position where the keys 62, 64 could otherwise slide through the slots 52, 54 with a resultant slippage of the drop hose to an undesired lowered position.

Figure 6:
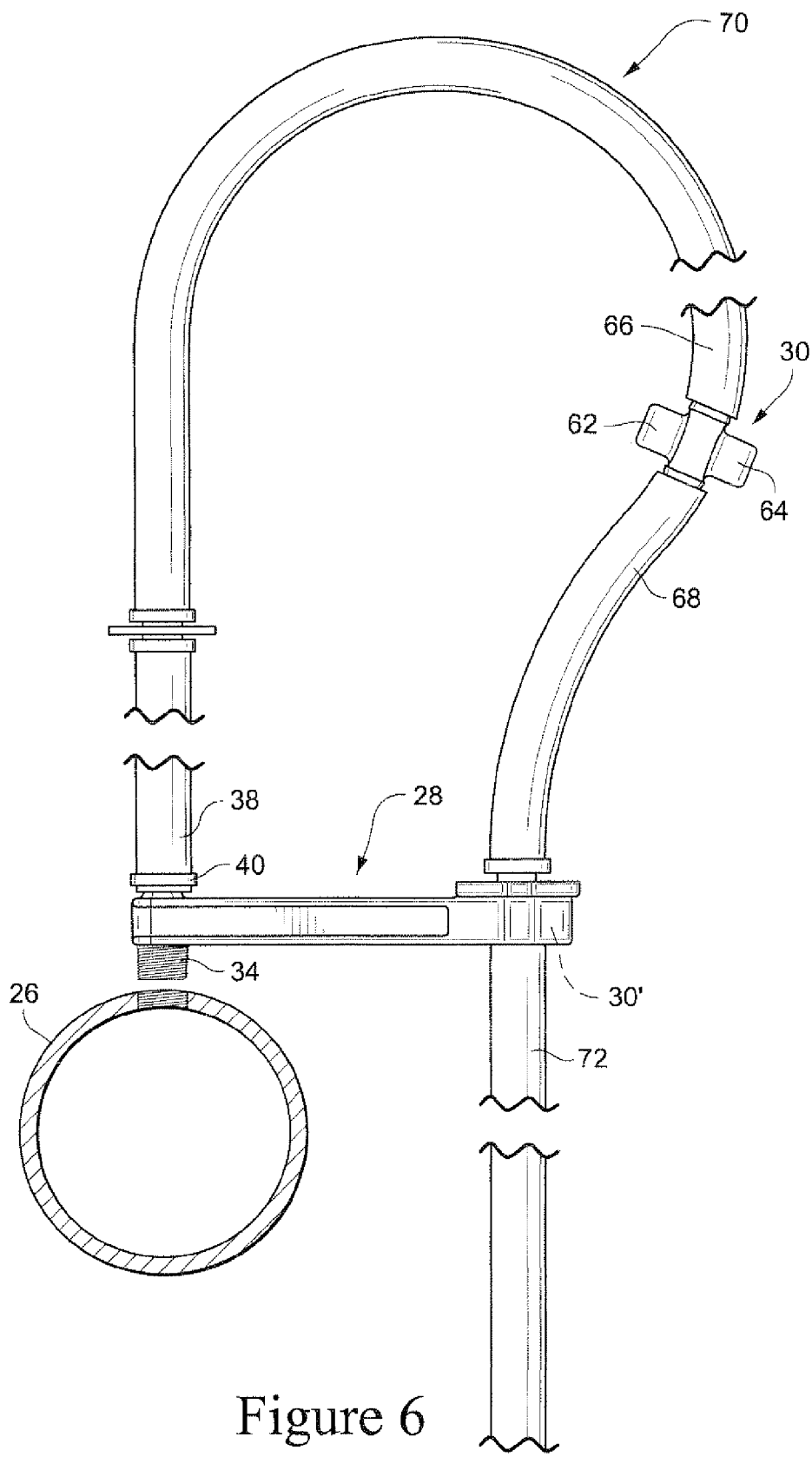
FIG. 6 is a side elevation similar to FIG. 5 but wherein the drop hose has been adjusted to raise the height of the sprinkler in accordance with the exemplary embodiment of the invention.

Note that FIGS. 5 and 6 illustrate two key-lock fittings 30, 30' along the length of the drop hose. In FIG. 5, key-lock fitting 30 is shown engaged within the hose retention ring 42, with a second key-lock fitting 30' disposed some predetermined distance below the engaged key-lock. This orientation may represent an arrangement where, for example, the sprinklers 18 are located three feet above the ground. If it is determined that an alternative sprinkler height of four feet above the ground is required, then the second lock-key fitting 30' would be located one foot below the first engaged key-lock fitting 30. Adjustment of the sprinkler height from three to four feet above the ground is achieved easily and reliably by pulling the gooseneck portion 70 of the drop hose upwardly to disengage the first key-lock fitting 30 and pulling the second key-lock fitting 30' through the opening 44 in the retention ring 42 in the manner described above, and then lowering the key-lock fitting 30' back into the opening 44 with the keys 62, 64 rotated to align with and seat in the recesses 48, 50. Using a flexible hose in the gooseneck section 70 allows the gooseneck loop to be expanded when the sprinkler height is increased as best seen in FIG. 6. If desired, the enlarged loop can be folded over and temporarily secured by any suitable retention feature such as a clip, spring, hook or the like.

It will be understood that the number of key-lock fittings 30 spliced into the drop hose may vary depending on the desired number of height adjustments. In other words, it may be desirable to have the flexibility to adjust the sprinkler height quickly, accurately and reliably to any one of three, four or more positions, and this is easily accomplished by having a like number of key-lock fittings 30 at the required intervals. It will also be understood that the number and type of drop hose sections 38, 66, 68, 72, etc. (all of which comprise the drop hose) may also vary and may include one or more rigid sections if deemed beneficial, but noting that a flexible section is required in the gooseneck section 70.

Further in that regard, all of the drop hose sections 68, 72, etc. below the gooseneck section 70 may be made of a semi-rigid or rigid material such as polyethylene or galvanized steel. These stiffer materials, in combination with the flexible gooseneck section 70, allow drop hose (and hence sprinkler) height adjustment from the ground. Specifically, the semi-rigid or rigid sections can be pushed upwardly through the retention ring 42 until the desired key lock fitting 30 passes through the retention ring a distance sufficient to permit rotation to align the keys 62, 64 with the locking recesses 48, 50 so that the key lock fitting 30 can then be lowered into the retention ring, engaging the keys 62, 64 within the locking recesses 48, 50. For this variation, it is understood that the key lock fittings 30 may be modified as needed to insure that the oppositely facing hose attachment features are suited to the drop hose sections. Thus, the opposed hose attachment features on the key lock fitting 30 may include male or female threads on one or both ends, or any combination of threads (male or female) and barbed hose fittings for maximizing the available hose selection options.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A height adjustment assembly for a drop hose on an irrigation machine comprising:

an elongated bracket having a first end provided with a pair of fittings, and a second opposite end provided with a drop hose retention ring;

said drop hose retention ring formed with an opening adapted to permit a drop hose to slide through the opening, said opening defined by an interior surface provided with a pair of diametrically opposed open slots, and a pair of diametrically opposed locking recesses formed with closed ends; and a key lock fitting adapted for connecting aligned hose ends of said drop hose and provided with a pair of diametrically-opposed keys which, in use, are adapted to slide through said pair of opposed open slots and, upon ninety degree rotation of said diametrically-opposed keys, to be received in and seated on said closed ends of said pair of diametrically opposed locking recesses.

2. The height adjustment assembly of claim 1 wherein said pair of fittings comprise a pair of coaxially-aligned fittings including a first a male thread fitting adapted to secure said elongated bracket to a water supply pipe on the irrigation machine, and a barbed hose fitting.

3. The height adjustment assembly of claim 1 wherein said pair of diametrically opposed open slots and said pair of diametrically opposed locking recesses have substantially identical cross-sectional shapes.

4. The height adjustment assembly of claim 1 wherein said key lock fitting is formed with oppositely-facing hose attachment features, and wherein said diametrically-opposed keys extend substantially transversely to a longitudinal center axis of said key lock fitting.

5. The height adjustment assembly of claim 3 wherein said key lock fitting is formed with oppositely facing hose attachment features, and wherein said diametrically-opposed keys extend substantially transversely to a longitudinal center axis of said key lock fitting.

* * * * *